No. 797,877. PATENTED AUG. 22, 1905.
H. A. VAIL.
SURFACE CULTIVATOR AND WEED CUTTER.
APPLICATION FILED JAN. 9, 1905.

2 SHEETS—SHEET 1.

Witnesses
Z. T. Fisher

Inventor
Harry A. Vail
By J. A. Rosen
Atty

No. 797,877. PATENTED AUG. 22, 1905.
H. A. VAIL.
SURFACE CULTIVATOR AND WEED CUTTER.
APPLICATION FILED JAN. 9, 1905.

2 SHEETS—SHEET 2.

Witnesses
J. T. Fisher
G. J. Rosen

Inventor
Harry A. Vail
By J. A. Rosen
Atty

UNITED STATES PATENT OFFICE.

HARVEY A. VAIL, OF LYON COUNTY, KANSAS.

SURFACE CULTIVATOR AND WEED-CUTTER.

No. 797,877.  Specification of Letters Patent.  Patented Aug. 22, 1905.

Application filed January 9, 1905. Serial No. 240,220.

*To all whom it may concern:*

Be it known that I, HARVEY A. VAIL, a citizen of the United States of America, residing in the county of Lyon and State of Kansas, have invented a new and useful Improvement in Surface Cultivators and Weed-Cutters, of which the following is a specification.

My invention relates to implements of the nature stated adapted for the care of all crops planted in rows; and the object is to provide such an implement which may be adjusted so as to be adapted to varying widths between the rows, to eliminate cumbersome and unnecessary parts from such a device, and withal to provide such an implement which is simple, strong, durable, and efficient.

The invention consists of the novel combination, arrangement, and disposition of the parts, the preferred form of the embodiment whereof is herein shown and described and is also shown in the accompanying drawings, forming part of this specification, and in which—

Figure 1:
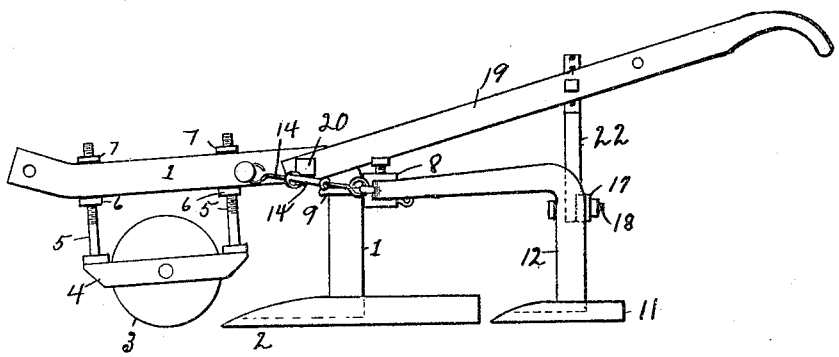
Figure 2:
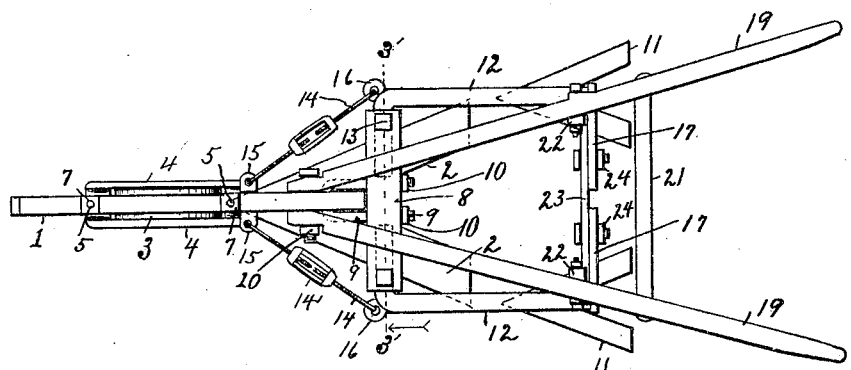
Figure 3:
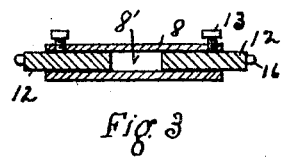
Figure 4:
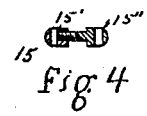
Figure 5:
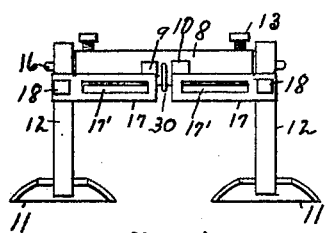
Figure 6:
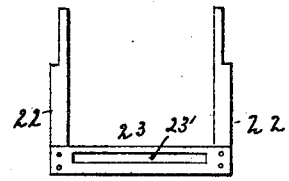
Figure 7:
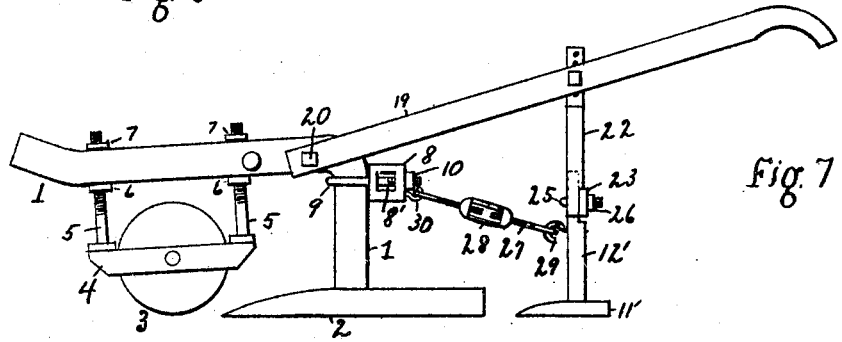
Figure 8:
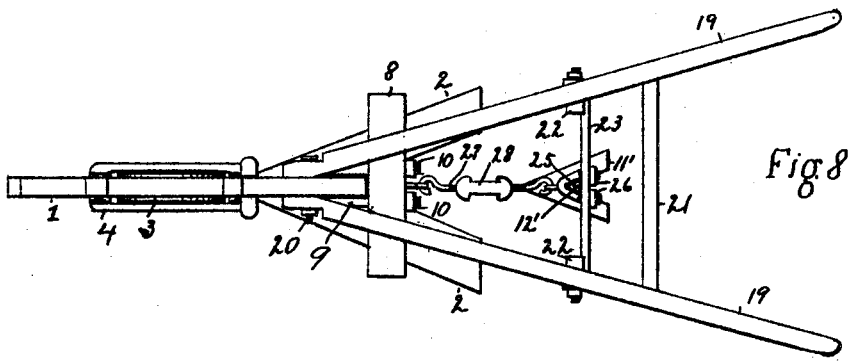

Figure 1 is a side elevation of the implement, and Fig. 2 is a top view thereof. Fig. 3 is a sectional view of the main coupling through the line 3' 3', Fig. 2. Fig. 4 is a sectional view of the brace coupling-pin. Fig. 5 is a rear elevation view of the smaller cultivator-blades with their shanks and beams, the coupling, and the short slotted bars. Fig. 6 is a rear view of the long slotted bar with the rods by which it is secured to the handle-braces. Figs. 7 and 8 show the implement with the smaller blades removed and the smallest blade substituted therefor in order to cultivate along a narrow row, Fig. 7 being a side view and Fig. 8 being a top view.

Like reference-numerals indicate like or corresponding parts throughout the several views.

To the main beam 1 is secured the large forward cultivator-blade 2. The wheel 3 is secured in a suitable frame 4, to which may be welded the threaded rods or bolts 5 5, extending through the main beam and adjustably secured thereto by means of the taps 6 6 below and 7 7 above. The coupling box or socket 8 is secured to the main beam by means of the stirrup 9 and the taps or nuts 10 10. The rear and smaller cultivator-blades 11 11 are secured to the shanks of the beams 12 12, respectively, which beams have each an inwardly-extending arm adapted to be adjustably held in the opposite openings 8' of the coupling-box by the set-screws 13 13. A main brace 14 connects each brace 12 with the coupling-pin 15, which consists of two parts 15' and 15'', which are adapted to be screwed together, as shown in Fig. 4. Each brace is provided with a turnbuckle and is connected with the ring or lug 16 of the beam 12. Also secured to each beam 12 by the bolt 18 is the short slotted bar 17. The handle-braces 19 are secured to the main beam by the bolt 20 and extend diverging rearwardly therefrom, a separator or stay-rod serving to keep them properly spaced, as at 21. Secured to each handle-brace is a depending rod 22, and to these rods is fastened the long slotted bar 23. The long and short slotted bars, their slots being in register, may be securely bolted together by the bolts 24 24.

If it is desired to cultivate a wider row than is adapted for cultivation by the implement when adjusted in the manner shown in the drawings, then by unscrewing the set-screws 13 13 and the bolts 24 24 and loosening the turnbuckles 14' 14' the beams 12 12, and with them the smaller blades 11 11, may be spread farther apart, so as to cover a wider path, when the set-screws and bolts may be again tightened. To adjust the implement to cultivate at varying depths, resort will be had to the taps 5 5 and 6 6 for adjusting the wheel 3 for the larger blade and to the stirrup 9, which may be adjusted vertically on the shank of the main beam, and to the rods 22 22, which may be adjusted vertically by means of several bolt-holes where it is attached to the handle-braces, for the smaller blades. The blades themselves are of peculiar shape and form in that they are of triangular shape, the two legs of the triangle being the cutting edges and their surfaces being convex instead of concave in the usual manner.

In case it is desired to cultivate between rows not wide enough to take in the implement, as illustrated in Figs. 1 and 2 of the drawings, then the smaller blades, with their beams and short slotted bars and main braces, may be removed, and in such case in order to have a suitable balancing device at the rear I provide a still smaller blade 11', whose shank 12' may be secured to the long slotted bar 23 by means of the stirrup 25 and nuts 26 26, which stirrup permits the vertical adjustment of the blade. A brace-rod 27, having a turnbuckle 28, connects the shank 12', through hook 29, with the main beam or main coupling-box through hook 30.

From the foregoing it will be readily understood that the cultivator may be readily adjusted to any width of row and to any depth of cultivation.

What I claim is—

1. In a surface cultivator and weed-cutter, the combination of the main beam and the cultivator-blade secured thereto; the wheel 3 adjustably secured to the beam; the coupling box or socket adjustably secured to the main beam; the rear laterally-disposed blades 11, 11, and the shanks and beams 12, 12 therefor, adjustably and removably secured to the coupling-box; the handles and handle-braces; and the slotted bars secured respectively to the beams 12, 12 and to the handle-braces; whereby the said blades 11, 11 may be adjusted and removed, as set forth.

2. In a surface cultivator and weed-cutter, the combination of the main beam and the cultivator-blade secured thereto; the wheel 3 adjustably secured to said beam; the coupling box or socket, and the stirrup for adjustably attaching said box to said beam; the rear laterally-disposed cultivator-blades 11, 11, and the shanks and beams therefor respectively, adjustably and removably secured to the coupling-box; the handles and braces; and the slotted bars secured respectively to the beams 12, 12 and to the handle-braces; whereby said blades 11, 11 may be adjusted laterally and removed; the cultivator-blades being of triangular form as shown with convex surfaces; all substantially as set forth.

3. In a surface cultivator and weed-cutter, the combination of the main beam and the cultivator-blade secured thereto; the wheel 3 secured to said beam; the coupling-box and the stirrup for adjustably attaching said box to said beam; the rear laterally-disposed blades 11, 11, and the shanks and beams 12, 12 therefor, respectively, said beams having their forward ends turned inwardly to engage the sockets of said coupling-box, and the set-screws for securing said ends therein; the short slotted bars secured to said beams 12, 12, respectively, and extending inwardly therefrom; the rods 22, 22 depending from the handle-braces, and the long slotted bar secured to said rods 22, 22; the bolts for securing the slotted bars together; and the handles and handle-braces; all substantially as set forth.

In testimony whereof I have hereunto set my hand in the presence of witnesses.

HARVEY A. VAIL.

Witnesses:
J. H. BURKE,
BENJ. DULLON.